US011271357B2

(12) United States Patent
Bauer et al.

(10) Patent No.: US 11,271,357 B2
(45) Date of Patent: Mar. 8, 2022

(54) OPTICAL ARRANGEMENTS WITH DISK-SHAPED LASER-ACTIVE MEDIUMS

(71) Applicant: TRUMPF LASER GMBH, Schramberg (DE)

(72) Inventors: Dominik Bauer, Rottweil (DE); Alexander Killi, Trossingen (DE); Sven-Silvius Schad, Rottweil (DE)

(73) Assignee: TRUMPF LASER GMBH, Schramberg (DE)

( * ) Notice: Subject to any disclaimer, the term of this patent is extended or adjusted under 35 U.S.C. 154(b) by 411 days.

(21) Appl. No.: 16/257,166

(22) Filed: Jan. 25, 2019

(65) Prior Publication Data

US 2019/0173257 A1 Jun. 6, 2019

Related U.S. Application Data

(63) Continuation of application No. PCT/EP2017/068199, filed on Jul. 19, 2017.

(30) Foreign Application Priority Data

Jul. 25, 2016 (DE) .......................... 102016213561.9

(51) Int. Cl.
*H01S 3/00* (2006.01)
*H01S 3/086* (2006.01)
(Continued)

(52) U.S. Cl.
CPC ............ *H01S 3/086* (2013.01); *G02B 7/1824* (2013.01); *H01S 3/042* (2013.01); *H01S 3/0405* (2013.01);
(Continued)

(58) Field of Classification Search
CPC ... G02B 7/1824; G02B 7/1822; H01S 3/2325; H01S 3/081; H01S 3/0604; H01S 3/0405; H01S 3/086; H01S 3/042
See application file for complete search history.

(56) References Cited

U.S. PATENT DOCUMENTS 6,590,712 B2   7/2003 Schaller
6,891,874 B2   5/2005 Erhard et al.
(Continued)

FOREIGN PATENT DOCUMENTS

CN        104242045 A       12/2014
DE    10 2011 004 204       8/2012
(Continued)

OTHER PUBLICATIONS

Antognini et al., "Thin-Disk Yb: YAG Oscillator-Amplifier Laser, ASE, and Effective Yb: YAG Lifetime," IEEE Journal of Quantum Electronics, Aug. 2009, 45: 993-1005.
(Continued)

*Primary Examiner* — Mark Hellner
(74) *Attorney, Agent, or Firm* — Fish & Richardson P.C.

(57) ABSTRACT

Disclosed are optical arrangements including: a disk-shaped laser-active medium, a deflecting device, having a plurality of mirror elements on which mirror faces for deflecting a laser beam are formed, and having a base body on which the mirror elements are fastened, the mirror faces of the mirror elements being oriented in such a way that the laser beam is deflected by a respective mirror face via the disk-shaped laser-active medium to another mirror face. The mirror elements are formed in one piece or are monolithically joined, and have a connecting section that is formed rotationally symmetrically with respect to a center axis and is rigidly connected by a material-fit connection or a direct connection to the base body.

16 Claims, 2 Drawing Sheets

(51) Int. Cl.
  *H01S 3/23* (2006.01)
  *H01S 3/06* (2006.01)
  *G02B 7/182* (2021.01)
  *H01S 3/04* (2006.01)
  *H01S 3/042* (2006.01)
  *H01S 3/081* (2006.01)

(52) U.S. Cl.
  CPC ............ *H01S 3/0604* (2013.01); *H01S 3/081* (2013.01); *H01S 3/2325* (2013.01); *G02B 7/1822* (2013.01)

(56) References Cited

U.S. PATENT DOCUMENTS

| | | |
|---|---|---|
| 7,463,667 B2 | 12/2008 | Vetrovec et al. |
| 7,817,704 B2 | 10/2010 | Seitel |
| 7,826,513 B2 | 11/2010 | Bossert et al. |
| 8,824,522 B2 | 9/2014 | Schad et al. |
| 9,063,336 B2 | 6/2015 | Kirch et al. |
| 9,806,484 B2 | 10/2017 | Xiao et al. |
| 2005/0030653 A1 | 2/2005 | Holderer et al. |
| 2005/0030656 A1* | 2/2005 | Holderer ............ G02B 26/0816 359/879 |
| 2007/0116081 A1 | 5/2007 | Vetrovec et al. |
| 2009/0059991 A1* | 3/2009 | Bossert ................. H01S 3/0604 372/93 |
| 2010/0027572 A1 | 2/2010 | Widen et al. |
| 2012/0155503 A1* | 6/2012 | Vetrovec ............... H01S 3/0604 372/95 |
| 2015/0249315 A1 | 9/2015 | Ueffing et al. |
| 2016/0285225 A1* | 9/2016 | Xiao .................... G02B 5/3066 |

FOREIGN PATENT DOCUMENTS

| | | | | |
|---|---|---|---|---|
| EP | 0113125 | 7/1984 | | |
| EP | 1 239 262 | 9/2002 | | |
| EP | 2 031 712 | 3/2009 | | |
| EP | 2 284 965 | 2/2011 | | |
| EP | 2 816 386 | 12/2014 | | |
| JP | H01-27931 | 5/1989 | | |
| JP | 2003-529919 | 10/2003 | | |
| JP | 2005-517291 | 6/2005 | | |
| JP | 2013-514639 | 4/2013 | | |
| JP | 2017199908 A | * 11/2017 | ............ | H01S 3/042 |
| WO | WO 2012/013512 | 2/2012 | | |
| WO | WO 2015/074244 | 5/2015 | | |

OTHER PUBLICATIONS

International Search Report and Written Opinion in Interntaional Application No. PCT/EP2017/068199, dated Nov. 21, 2017, 22 pages (with English translation).

Tümmler et al., "High-repetition-rate chirped-pulse-amplification thin-disk laser system with joule-level pulse energy," Optics Letters, May 2009, 34: 1378-1380.

CN Office Action in Chinese Appln. No. 201780046282.0, dated Jul. 1, 2020, 20 pages (with English translation).

CN Search Report in Chinese Appln. No. 201780046282.0 dated May 12, 2020, 2 pages (with English translation).

JP Japanese Office Action in Japanese Appln. No. 2019-503732, dated May 10, 2021, 11 pages (with English translation).

JP Japanese Decision to Grant in Japanese Appln. No. 2019-503832, dated Dec. 15, 2021, 6 pages (with English translation).

* cited by examiner

OPTICAL ARRANGEMENTS WITH DISK-SHAPED LASER-ACTIVE MEDIUMS

CROSS REFERENCE TO RELATED APPLICATIONS

This application is a continuation of and claims priority under 35 U.S.C. § 120 from PCT Application No. PCT/EP2017/068199 filed on Jul. 19, 2017, which claims priority from German Application No. DE 10 2016 213 561.9, filed on Jul. 25, 2016. The entire contents of each of these priority applications are incorporated herein by reference.

TECHNICAL FIELD

The present invention relates to an optical arrangement, such as a (linear) disk laser amplifier.

BACKGROUND

In the article, "Thin-Disk Yb:YAG Oscillator-Amplifier Laser, ASE, and Effective Yb:YAG Lifetime," by A. Antognini et al., IEEE Journal of Quantum Electronics, Vol. 45, No. 5, August 2009, a multipass disk laser amplifier is disclosed, in which an array of 24 plane mirrors is used to deflect the laser beam to the laser disk. The mirrors are arranged on a common base plate, and the orientation of each individual mirror can be varied individually so that, on each pass of the laser beam through the laser disk, its beam profile can be adapted individually. In the article "High-repetition-rate chirped-pulse-amplification thin-disk laser system with joule-level pulse energy", by J. Tümmler et al., Optics Letters, Vol. 34, No. 9, May 1, 2009, a multipass amplifier is disclosed, in which an array of 7×4 mirrors is used to deflect the laser beam, the mirrors likewise being arranged on a common base plate and being individually adjustable.

U.S. Pat. No. 7,463,667 B2 has disclosed a laser system having a solid-state laser amplifier material module (LGM module), as well as a multipass resonator, which comprises a plurality of pairs of relay mirrors, each having a first and a second mirror. The laser beam is reflected to and fro between the same position on the LGM module and each pair of the plurality of pairs of relay mirrors. The LGM module and the resonator are accommodated in a resonator housing, and the plurality of mirrors are held in a holding arrangement that maintains the orientation and the positioning of the mirrors relative to one another and with respect to the LGM module, to achieve the effect that the laser beam is reflected correctly to and fro between the mirror pairs and the LGM module.

Optical amplifier arrangements in the form of disk laser amplifiers or disk lasers comprise a disk-shaped laser-active medium having a small thickness (laser disk). In such an optical arrangement in the form of a linear disk laser amplifier, i.e. a laser amplifier in which no feedback through a resonator takes place as is the case with a regenerative amplifier, a laser beam is intended to be amplified to higher powers and, in the case of pulsed radiation, to higher pulse energies. The relatively low gain on one pass through the laser disk typically requires a large number of passes through the laser disk. This high number of passes is often achieved with a relatively long beam path. Linear disk amplifiers are suitable in particular for scaling in the high-power range and short- or ultrashort-pulse range, since because of a large beam diameter in the entire disk laser amplifier low intensities and nonlinearities can be achieved with only small optical aberrations. An optical amplifier arrangement in the form of a disk laser amplifier is sensitive in relation to misalignment because of the long beam paths and the relatively large number of optical components for carrying out the passes through the laser disk.

U.S. Pat. No. 7,817,704 B2 discloses a monoblock laser that comprises a support extending along its axis, on which an adjustable element rotatable about the axis bears. The adjustable element may be rotatably mounted in a support configured as a V-block. As an alternative, the adjustable element, for example in the form of a mirror, may have a spherically shaped bottom and the substrate of the support may comprise a spherically shaped recess for receiving the adjustable element.

EP 2 816 386 A1 disclosed an optical arrangement, having an optical element, that is adhesively bonded by means of at least one holding element on a base body, the optical element and the holding element bearing directly on one another via a curved junction side on the optical element side and/or a curved junction side on the holding element side along a contact line, and being adhesively bonded by means of an adhesive, that is introduced into at least one joint present next to the contact line between the junction sides.

WO 2012/013512 A1 describes an optical arrangement, having a base plate that comprises a recess with a wall having a bearing region, as well as an optical holder that holds an optical element and which comprises a lower side having a contact region. Formed between the lower side of the optical holder and the bottom of the recess, there is a cavity that is filled with a curable adhesive that is used for fixing the optical holder. By additional soldering or spot welding or spot laser welding, an improvement of the fixing of the optical holder can be achieved.

SUMMARY

Various aspects of the invention relate to methods of providing optical arrangements, particularly in the form of a (linear) disk laser amplifier, in which there is a low risk of misalignment.

Certain aspects provide optical arrangements in the form of optical amplifier arrangements in the form of a disk laser amplifier. The disk laser amplifier includes a disk-shaped laser-active medium, a deflecting device, having a plurality of mirror elements on which mirror faces for deflecting a laser beam are formed, and having a base body on which the mirror elements are fastened. The mirror faces of the mirror elements are oriented in such a way that the laser beam is deflected by a respective mirror face via the disk-shaped laser-active medium to another mirror face. The mirror elements are therefore arranged in pairs, between the mirror faces of which the laser beam is deflected via the disk-shaped laser-active medium. The mirror elements are formed in one piece or are monolithically joined, and have a connecting section, which can be formed rotationally symmetrically with respect to a center axis and is connected rigidly, i.e. permanently, by a material-fit connection or a direct connection to the base body.

In the context of this application, monolithically joined mirror elements are intended to mean mirror elements, which are formed from a plurality of components that are rigidly and permanently connected to one another, the connection between the components of the mirror element likewise being carried out by a material-fit connection or by a direct connection.

Typically, mirror elements are held in a mirror holder having an adjustable wobble plate. This allows precise orientation of a respective mirror element, or more precisely the mirror face, with an accuracy in the range of for example about 10 µrad. A deflecting device that includes a plurality of such mirror holders and that may be used to produce a disk multipass amplifier, as is the case in the two articles cited above, however offers a large number of adjustment degrees of freedom with significant misalignment and mounting risk.

According to certain embodiments of the invention, this risk is minimized by mirror elements connected rigidly, i.e. permanently, to the base body, for example in the form of a base plate. By the permanent connection, the misalignment degrees of freedom can be reduced to a minimum, and misalignments during operation of the optical arrangement may be essentially prevented. To minimize the misalignment degrees of freedom, the mirror elements are fastened on the base body, or connected thereto, either by a material-fit joining technique, for example by adhesive bonding, soldering or welding, or by direct permanent connection, for example by bonding or glass welding. Furthermore, the mirror elements are either formed in one piece or monolithically joined. The mirror elements, or more precisely the mirror faces of the mirror elements, should typically be mounted permanently and stably on the base body, or oriented relative thereto, with an accuracy of about 10 µrad. The base body is formed in one piece in particular implementations, but it may optionally likewise be monolithically joined.

In certain embodiments, the (planar) mirror faces of the mirror elements are oriented at an angle of between 30° and 60°, e.g., between 35° and 55° or e.g., between 40° and 50°, with respect to the center axis of the connecting section. The normal directions of the mirror faces of the mirror elements of the deflecting device must on the one hand be selected in such a way that direct deflection to a respective further mirror face can take place, and on the other hand in such a way that the laser disk typically is struck centrally by the laser beam. To this end, when mounting a respective mirror element on the base body, the center axis of a respective connecting section may be oriented at a suitable angle with respect to the (plate-shaped) base body. In particular, to this end the center axes of the connecting sections of different mirror elements may be oriented differently in relation to the base body. In this case, optionally all mirror elements of the deflecting device, which are arranged in a circular ring (see below), may be oriented at the same angle with respect to the center axis of the connecting section, so that only a single type of mirror elements is required in the deflecting device, with the result that production of the deflecting device is simplified. The (constant) angle at which the normal direction is oriented with respect to a respective connecting section is in this case typically close to 45°, since deflection by exactly 45° is typically possible only at the center of the base body, through which the center axis of the base body extends.

In other embodiments, for a first mirror element the mirror face is oriented at a first angle with respect to the center axis of the connecting section, and for a second mirror element the mirror face is oriented at a second angle, different to the first angle, with respect to the center axis of the connecting section. In this case, two or more, generally a plurality of, for example ten or more, different angles and therefore ten or more different types of mirror elements, are used in the deflecting device, the difference between the orientation of the mirror faces of the different mirror elements typically being relatively small, so that they typically differ by less than 10°, e.g., by less than 5°, from an angle of 45°. It is to be understood that, in addition to the use of different types of mirror elements, the orientation of the center axes of the respective connecting sections in relation to the base body may also vary.

In particular embodiments, recesses are formed in the base body, which respectively have a lateral face for the material-fit or direct connection to the connecting section of a respective mirror element. In such embodiments, the mirror elements, or more precisely their connecting sections, may be fitted into the recesses so that they bear pointwise, linearly, or optionally two-dimensionally on the lateral face of a respective recess. The recesses may be formed in a base body in the form of a base plate having an essentially constant thickness. It is, however, also possible for the recesses to be formed in elevations or thickenings of the base body, i.e. it is not absolutely necessary for the recesses to be set back in relation to the rest of the base body, for example in the form of a base plate.

In certain embodiments, the recesses form holes in the base body. This is favorable for production of the connection between the lateral face of a respective recess and the connecting section during mounting or adjustment of a respective mirror element. For example, in the case of a material-fit connection, the joining means, for example an adhesive, may be introduced from the lower side, facing away from the respective connecting section, of the base body, between the lateral face and the surface of the respective connecting section, which is more easily accessible from the lower side of the base body than from the upper side.

In particular embodiments, the lateral faces of the recesses are formed rotationally symmetrically with respect to a respective center axis of the lateral faces. In this case, typically by rotation of a respective mirror element in the recess, the orientation of the mirror element relative to the base body can be modified before it is fixed in its position by the material-fit or direct connection in the recess.

In certain embodiments, the lateral faces of the recesses form a spherical face, a conical face or a freeform face. If the connecting section of the mirror elements has a radially ground or polished surface, this may be brought into linear or circular contact with the lateral face in the form of the spherical face, the conical face or the freeform face, for example in the form of an axicon. By displacement or rotation of the mirror element along the lateral face, the mirror element can in this case be adjusted in three angles, i.e. both a rotation angle of the mirror element with respect to the center axis of the lateral face of the recess and two tilt angles between the center axis of the connecting section and the center axis of the mirror element can be adjusted, before the mirror element is rigidly connected to the base body.

In particular embodiments, the center axis of the connecting section of at least one mirror element is oriented at a tilt angle with respect to the center axis of the lateral face. As explained above, in this way, the orientation of the mirror face of a respective mirror element relative to the base body, and therefore also relative to the laser-active medium, can be modified. In this way, it is typically possible to reduce the number of mirror elements that have a respectively different angle between the center axis of the connecting section and the mirror face. The tilt angle or angles of a respective mirror element depends/depend in particular on the radial distance of the respective mirror face from the center axis of the base body, on which the disk-shaped laser-active medium separated from the base body is also arranged. In general, the center axis of the lateral face of the recess is oriented parallel or essentially parallel to the center axis of the generally plate-shaped base body. Optionally, a recess or its center axis may, however, also be inclined or tilted at a (possibly considerable) angle relative to the center axis of the plate-shaped base body.

In certain embodiments, the connecting section is formed by a spherical segment, and the spherical segment is connected at a spherical cap of the spherical segment, i.e. at a spherically curved surface of the spherical segment, with a material fit or directly to the lateral face of the recess of the base body. The use of spherical connecting sections has proven advantageous since they greatly simplify the adjustment or orientation of the mirror elements in the recesses, and with a suitable rotationally symmetrical configuration of the lateral face, it is possible to achieve linear or circular contact.

In particular embodiments, the mirror element includes a cylindrical section that is adjacent to the spherical segment and on which the mirror face is formed. The (planar) mirror face on the cylindrical section may, for example in the case of an end mirror, be oriented perpendicularly to the cylinder axis and have a circular geometry, although in general the mirror face is oriented at an angle of close to about 45° relative to the cylinder axis and therefore has an elliptical geometry. The mirror face, or the edge of the mirror face, may be directly adjacent to the connecting section, although it is also possible for a generally cylindrical intermediate section, to which a prismatic cylindrical section with the mirror face is adjacent, to extend between the connecting section and the mirror face in the direction of the center axis. For the case in which the mirror elements are monolithically joined, the joining positions or joining faces are typically located at the transitions between the individual sections, for example at the transition between the (for example spherical) connecting section and the cylindrical section, on which the mirror face is formed.

In certain embodiments, the spherical segment of the connecting section has a radius of curvature whose center point lies on the mirror face of the mirror element, and typically in the middle of the mirror face, at which the center axis of the connecting section typically passes through the mirror face. If this is the case, i.e. if the radius of the spherical segment corresponds to the mirror height, adjustment of the mirror element without lateral offset is possible, i.e. in this case no lateral offset of the center point of the mirror face takes place when modifying the tilt angle between the center axis of the connecting section and the center axis of the recess.

In particular embodiments, the connecting section of the mirror elements is formed cylindrically, and may include a planar base face. The cylindrical connecting section can, in this case for example, be fitted into a likewise cylindrical recess of the base body that has a shoulder for supporting the planar base face. In this way, the height or the distance of the mirror face from the base body is determined and the tilt angle can generally also not be changed during adjustment, since the center axis of the connecting section is typically oriented parallel to the center axis of the cylindrical recess. Only the orientation of the mirror face with respect to the center axis of the recess can be set by rotation of the mirror element about its center axis.

As an alternative to the use of recesses in the base body, the planar base face of the connecting section may be placed on, for example, a planar surface of the base body, and the position of the mirror element on the surface of the base body may be fixed, for example with the aid of a template that has circular openings, so that the mirror element can then only be rotated about its center axis to determine the rotation angle of the mirror face with respect to the center axis. In this case, the joining component, for example an adhesive, may be applied in the region of the openings of the template onto the surface of the base body, before the mirror elements are brought to bear on the surface, and the adjustment may be carried out by rotation about the center axis so long as the joining component has not yet been cured. As an alternative or in addition, fixing of the mirror elements may be carried out after the adjustment, for example by soldering or by (glass) welding. As described above, modification of the tilt angle is not possible when using mirror elements that have a cylindrical connecting section, so that it is generally necessary to use a plurality of different types of mirror elements in the optical arrangement, which have different angles between the mirror face and the center axis of the connecting section.

In certain embodiments, the plurality of mirror elements are arranged on the base body in a plurality of circular rings or in a plurality of regular polygons, for example in a plurality of regular hexagons, concentrically about a center axis of the base body, on which the center of the disk-shaped laser-active medium typically also lies. By a maximally uniform or regular arrangement of the mirror elements, it is possible to use only a small number of different types of mirror elements.

Typically, direct deflection takes place between the mirror faces of respectively two mirror elements, i.e. no other optical elements are arranged in the beam path between the mirror faces of the two mirror elements. By the direct deflection between respectively two, in particular neighboring, mirror elements (in each case essentially by about 2×90°), the number of mirror elements that are required for the deflection is small and the complexity of the beam path can in this way also be reduced. The mirror elements between which direct deflection takes place are typically arranged next to one another, and may be located in the same circular ring or in the same polygon, or in typically neighboring circular rings or polygons. The direct deflection between respectively two neighboring mirror elements may, for more than half of the mirror elements, take place respectively essentially in the circumferential direction, i.e. in a rotating pattern. Deflection in such a rotating pattern is generally favorable to correct a possibly existing astigmatism.

In particular embodiments, for more than half of the mirror elements, direct deflection takes place between the mirror faces of respectively two neighboring mirror elements along a common (i.e. the same) deflection direction. Such a deflection, with which the laser beam is respectively deflected parallel for more than half of the total number of mirror elements, has an advantageous effect in relation to a thermally induced misalignment of the laser beam in a spatial direction. In the embodiment described here, the arrangement of the mirror elements in a plurality of regular polygons, for example in a plurality of regular hexagons, is generally particularly advantageous since in this case a plurality of mirror faces are arranged along a common line, which corresponds to an edge of the polygon.

With the direct 90° deflection as described here at mirror faces, which are typically struck at different angles of incidence, the polarization state of the laser beam generally varies because of the angle of incidence-dependent polarization properties of the reflective coating. Compensation for the change in the polarization state of the laser beam may, for example, be carried out by special phase-compensating mirror faces, or reflective coatings, or by a suitable combination of phase-shifting optical elements, for example a λ/4 and/or λ/8 plate, which are arranged in the beam path of the laser beam and form a part of the optical arrangement.

In certain embodiments, the optical arrangement, generally the deflecting device, includes an end mirror whose mirror face is oriented perpendicularly to the laser beam striking the mirror face of the end mirror, so that the laser beam is reflected back to the disk-shaped laser-active medium. By using the end mirror, the laser beam can pass through the deflecting device for a second time in the opposite direction, so that the number of passes through the disk-shaped laser-active medium is doubled. The mirror face of the end mirror is to this end oriented perpendicularly to the incident (and reflected) laser beam.

It is to be understood that the deflecting device, or the optical arrangement, does not necessarily require an end mirror. For example, this is typically the case when high gain factors are not required, for example because the input power of the seed laser beam is already relatively large. In this case, the laser beam may, for example, be extracted through an access opening in the base body, or in another way, out of the optical arrangement and does not pass through the deflecting device for a second time. Input of the laser beam into the optical arrangement may also be carried out through an access opening in the base body, or optionally through a suitable deflecting element.

The base body of the deflecting device is formed from a material that coincides to at least 80 wt % with the material of the mirror elements in particular implementations. In this case, the thermal expansion coefficients of the materials used are typically sufficiently similar. The materials whose chemical composition coincides to at least 80 wt % may, for example, be (conventional) quartz glass and doped quartz glass, for example titanium-doped quartz glass (ULE®), which generally has a TiO2 content of less than about 20 wt %.

In particular embodiments, the base body and/or the mirror elements are formed from glass, e.g., from quartz glass, from a glass ceramic or from a metallic material, e.g., from an alloy. It has proven favorable for the base body and/or the mirror elements to be formed from a material that is (essentially) transparent for the laser radiation, since in this way any stray light due to the mirror elements, for example in the form of scattered radiation, does not lead to any heating on adjustment-critical components. For example, borosilicate crown glass (BK7) or quartz glass may be used as the glass, and for example Zerodur® may be used as the glass ceramic. Both Zerodur® and ULE® have a particularly low thermal expansion coefficient over a relatively large temperature range, which has proven advantageous for the present applications. Metallic materials, in particular certain alloys in which the so-called Invar effect occurs (Invar alloys), also have a very low thermal expansion coefficient. One example of such an Invar alloy is an iron-nickel alloy having a proportion of about 36% nickel.

The base bodies of the deflecting device and the mirror elements are formed from materials whose thermal expansion coefficients (length expansion coefficients) are essentially equal, in certain implementations. The thermal expansion coefficients may for example differ by less than $2 \times 10^{-6}$ 1/K, and specifically over the entire temperature range relevant here between about $-30°$ C. and about $200°$ C. To avoid stresses occurring between the mirror elements and the base body of the deflecting device under heating by the laser radiation during operation of the optical arrangement, all the carrying components, i.e. typically the base body as well as generally also the mirror elements, are produced from materials having a sufficiently similar, ideally having the same, thermal expansion coefficient.

In certain embodiments, the material-fit connection is formed by an adhesive connection and/or a soldered connection, or the direct connection, is formed by a welded connection and/or by a bonding connection. For monolithic joining of the mirror elements, or more precisely of their connecting sections, to the base body, there are several possibilities. For example, a material-fit connection may be carried out by using a joining agent, for example by using an adhesive. As an alternative or in addition, soldered connection may be carried out with the aid of a joining agent in the form of a (glass) solder. As an alternative, direct connection may be carried out between a respective mirror element and the base body, for example by a glass welding process. The direct connection may also be carried out by a so-called (direct) bonding method, in which the two materials to be connected, which typically contain silicon, are heated on the respective surfaces to be connected to such an extent that a permanent connection is formed between them. A permanent, for example material-fit, connection may also be established between a metallic material and a glass material, or alternatively a direct connection is possible, for example a welded connection.

In the direct connection techniques described here, it is favorable for them to have a high surface quality. A high surface quality may, for example, be achieved by grinding or polishing the material of the respective components. A high surface quality is, for example, favorable to achieve the effect that the respective components can be moved against one another with the required precision. In the event of a surface quality that is too high, contact bonding may take place between the components, which makes movement of the components relative to one another difficult. It is therefore necessary to make a compromise when selecting the surface quality.

Further advantages of the invention may be found in the description and the drawings. Likewise, the features mentioned above and those referred to below may be used independently, or several of them may be used in any desired combinations. The embodiments shown and described are not to be interpreted as an exhaustive list, but rather have an exemplary nature for description of the invention.

DETAILED DESCRIPTION

In the following description of the drawings, identical references are used for components that are the same or functionally equivalent.

Figure 1:
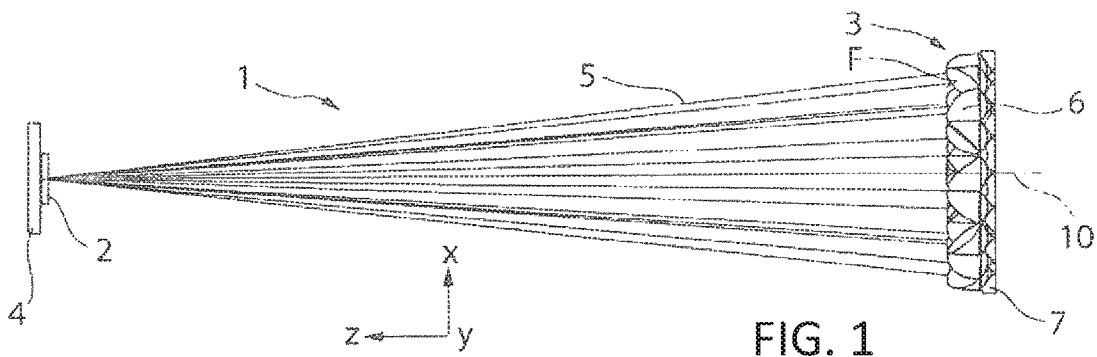
FIG. 1 shows a schematic representation of an exemplary embodiment of a disk laser amplifier having a laser disk and having a deflecting device with a plurality of mirror elements.

FIG. 1 shows by way of example an optical arrangement, or more precisely an optical amplifier arrangement, in the form of a (linear) disk laser amplifier 1, which comprises a disk-shaped laser-active medium, referred to below as the laser disk 2, and a deflecting device 3. The laser disk 2 is fastened on a heat sink 4 and is mirrored on its side facing toward the heat sink 4 to reflect a laser beam 5 to be amplified, which emanates from the deflecting device 3 and strikes the laser disk 2, back to the deflecting device 3, so that the laser disk 2 is passed through several times by the laser beam 5 and is thereby amplified.

Figure 2A:
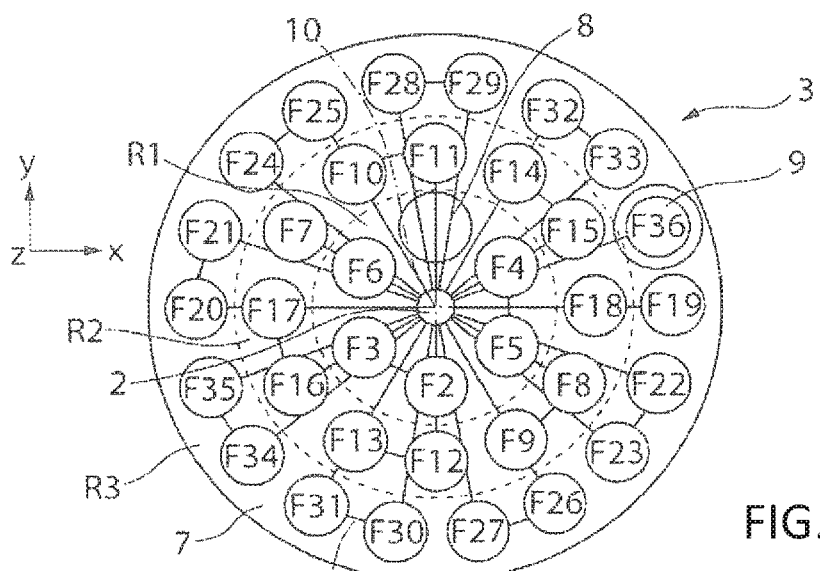
FIGS. 2A and 2B show schematic representations of the mirror faces of the mirror elements, which are arranged in three circular rings or in three hexagons, respectively in a plan view.
Figure 2B:
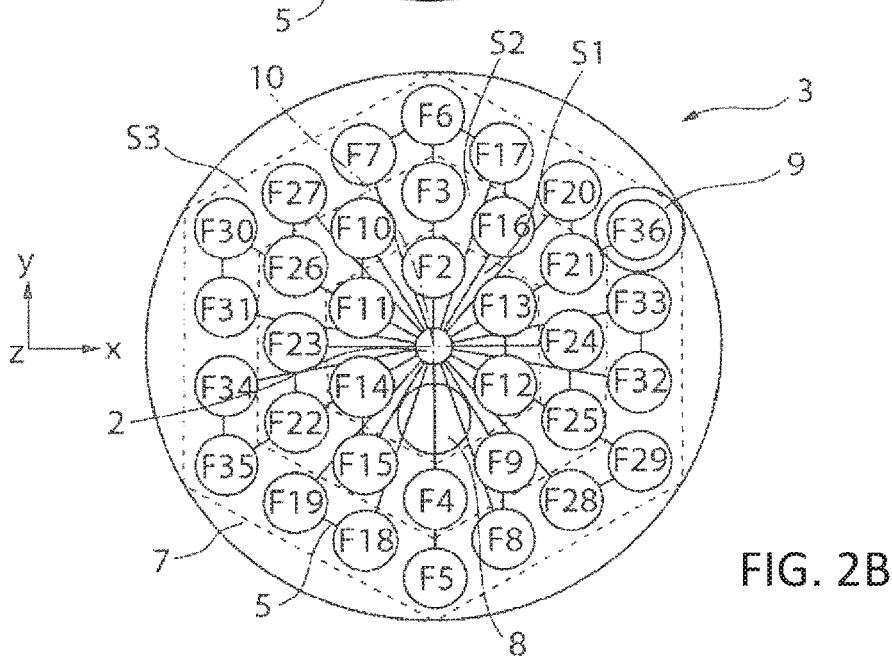

To allow such a multiple pass through the laser disk 2, the laser beam 5 is deflected by mirror elements 6, in the form of deflecting mirrors, formed at the deflecting device 3, or more precisely at their mirror faces F2 to F35 (cf. FIGS. 2A and 2B). The mirror elements 6 are fastened on a plate-shaped base body 7 of the deflecting device 3 with the aid of a monolithic construction technique, which will be described in more detail below. It is to be understood that the deflecting device 3 may also have a greater or smaller number of mirror elements 6. In the example shown, the plate-shaped base body 7 is oriented parallel to the XY plane of an XYZ coordinate system and parallel to the laser disk 2. It is, however, to be understood that, with suitable orientation of the mirror elements 6, the plate-shaped base body 7 may optionally be oriented at a (small) angle with respect to the XY plane.

As can be seen in FIGS. 2A and 2B, the laser beam 5, which is generated by a laser source (not shown), passes via an access opening 8 through the plate-shaped base body 7, for example, and is in this case oriented in such a way that it strikes the laser disk 2 centrally and is reflected at it, or more precisely at its mirrored rear side, to a second mirror face F2. The laser beam 5 emanating from the laser disk 2 is deflected, or reflected, at the second mirror face F2 directly to a third, neighboring mirror face F3. The third mirror face F3 is oriented with respect to the laser disk 2 in such a way that the laser beam 5 is deflected, or reflected, by the third mirror face F3 to the laser disk 2 again. At the laser disk 2, the laser beam 5 is deflected to a fourth mirror face F4, reflected thereby directly to a fifth mirror face F5, etc.

In the deflecting devices 3 shown in FIGS. 2A and 2B, the deflection of the laser beam 5 therefore takes place alternately between the laser disk 2 and a respective pair of mirror faces (arranged next to one another in the example shown) F2, F3; F4, F5; F5, F6; . . . , F34, F35. The beam path of the laser beam 5 between the laser disk 2 and the mirror faces F2, F3; F4, F5; F5, F6; . . . , F34, F35, or more precisely the projection thereof into the XY plane, is likewise represented in FIGS. 2A and 2B. In the examples shown in FIGS. 2A and 2B, the deflecting devices 3 respectively have an end mirror 9, the mirror face F36 of which is oriented perpendicularly to the laser beam 5 striking the mirror face F36 of the end mirror 9, so that the laser beam 5 is reflected back (i.e. on itself) to the disk-shaped laser-active medium 2 and travels along the beam path through the deflecting device 3 for a second time with an opposite propagation direction. It is to be understood that, instead of the end mirror 9, a further access opening may be provided in the deflecting device 3, to extract the laser beam 5 from the disk laser amplifier 1 without it passing through the deflecting device 3 again, or it is possible to provide a deflecting mirror that extracts the laser beam from the disk laser amplifier 1.

The deflecting devices 3 shown in FIGS. 2A and 2B differ essentially in that in the deflecting device 3 shown in FIG. 2A the mirror elements 6 are arranged in a circular pattern, or more precisely in three circular rings R1, R2, R3, concentrically around a center axis 10, extending in the Z direction, of the plate-shaped base body 7, while in the deflecting device 3 shown in FIG. 2B the mirror elements 3 are arranged in three regular, concentrically arranged hexagons S1, S2, S3 about the center axis of the plate-shaped base body 7. The arrangement, shown in FIG. 2B, of the mirror elements 6 in a hexagonal pattern is particularly compact.

In the example shown in FIG. 2A, the direct deflection between the mirror faces F2, F3; F4, F5; F6, F7; . . . of neighboring mirror elements 6 takes place rotatingly, i.e. essentially in the azimuthal direction, or in the circumferential direction. Only to switch between the ring regions R1, R2, R3 does deflection take place in the radial direction. In contrast thereto, in the deflecting device 3 shown in FIG. 2B the deflection between the mirror faces F2, F3; F4, F5; F6, F7; . . . of respectively two neighboring mirror elements 6 takes place in the same direction for more than half of the mirror elements, in the example shown in the Y direction, and specifically for precisely twenty-eight of the in total thirty-four mirror elements 6.

It is to be understood that the rotating deflection shown in conjunction with FIG. 2A and the deflection, shown in FIG. 2B, in a common direction Y may also be combined in the same deflecting device 3, for example to optimize the correction of imaging errors. In the arrangement, shown in FIG. 2B, of the mirror elements 6 in a plurality of hexagons S1, S2, S3, an essentially rotating deflection may also take place, and in the arrangement, shown in FIG. 2A of the mirror elements 6 in a plurality of circular rings R1, R2, R3, deflection that is carried out essentially along a common direction may take place.

To ensure the greatest possible stability of the disk laser amplifier 1, the number of movement degrees of freedom of the mirror elements 6, or of the mirror faces F2, F3, . . . is minimized in the case of producing the deflecting device 3 by a monolithic construction technique in its connection to the plate-shaped base body 7, as described in more detail below.

Figure 3A:
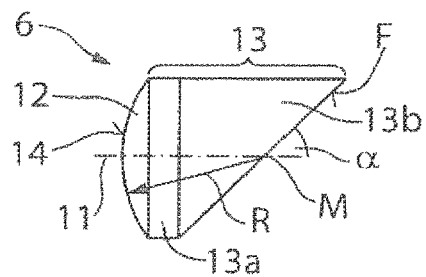
FIG. 3A shows a schematic representation of a mirror element in the form of a deflecting mirror.

FIG. 3A shows, by way of example, one of the mirror elements 6, which has a connecting section 12, formed rotationally symmetrically with respect to a center axis 11, in the form of a spherical segment. The connecting section 12 is adjacent to a cylindrical section 13 along the center axis 11, which is subdivided into a fully cylindrical first section 13a and a prismatic second section 13b. The prismatic section 13b is likewise cylindrical along its circumference, the plane mirror face F forming a cross section through the cylindrical section 13 in the form of an elliptical face. Instead of a planar mirror face F, it is optionally also possible to use a curved mirror face F, for example a parabolically curved mirror face F, to achieve a focusing or defocusing effect.

The center axis 11 of the mirror element 6 extends through the center point M of the mirror face F. The laser beam 5 strikes the mirror face F typically in a centered fashion, i.e. the center of the beam cross section of the laser beam 5 ideally coincides with the midpoint M of the mirror face F.

In the example shown, the center point M of the mirror face F at the same time forms the center point M of the radius of curvature R (for example of about 15 mm) of the spherical cap 14, i.e. of the spherical surface of the connecting section 12 of the mirror element 6, which is favorable for the adjustment (see below).

In the example shown, the mirror face F is oriented at an angle α of 45° with respect to the center axis 11 of the connecting section 12. As can be seen in FIG. 1, the angle of incidence, or the angle of reflection, of the laser beam 5 on a respective mirror face F2, F3, . . . depends on the position of the respective mirror element 6 in relation to the laser disk, in particular on the radial distance from the center axis 11 of the base body 7 of the deflecting device 3. To ensure that the laser beam 5 is respectively deflected from or to the laser disk 2 during the reflection at the respective mirror face F2, F3, . . . it is favorable to vary the angle α of the mirror face F2, F3, . . . with respect to the center axis 11 of the connecting section 12, i.e. to use a plurality of types of mirror elements 6, which differ from one another only by the angle α of the mirror face F2, F3, . . . with respect to the center axis 11 of the connecting section 12.

Because of the fact that the laser beam 5 is reflected directly to a generally neighboring mirror element 6, the deviation of the angle α from 45° should not be selected to be too great. Typically, the angle α lies between about 30° and about 60°, e.g., between 35° and 55°, for example between 40° and 50°. The number of different angles α, and therefore of different types of mirror elements 6, depends on the arrangement of the mirror elements 6 on the base body 7, as well as on the direction of the deflection between the mirror elements 6 in relation to the XY plane. The selection of the angle α also depends on whether the center axis 11 of a respective connecting section 12 is oriented perpendicularly to the XY plane, or possibly oriented at a tilt angle relative thereto, as will be described in more detail below.

Figure 3B:
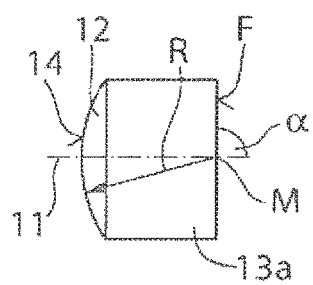
FIGS. 3B and 3C show schematic representations of a mirror element in the form of an end mirror.
Figure 3C:
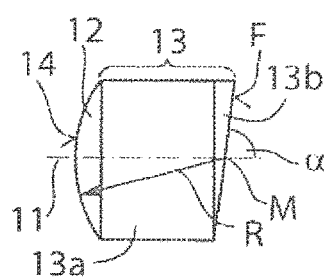

FIGS. 3B and 3C show two examples of the configuration of the end mirror 9 of FIGS. 2A and 2B with a mirror face F, which in the example shown in FIG. 3B is oriented perpendicularly to the center axis 11 of the spherical segment 12, i.e. at an angle α of 90°, while the mirror face F in the example shown in FIG. 3C is oriented at an angle α of about 83° with respect to the center axis 11 of the connecting section 12. Both in FIG. 3B and in FIG. 3C, the radius of curvature R of the spherical segment 12 is selected in such a way that the center point M of the mirror face F corresponds to the center point M of the radius of curvature R. This is favorable for the adjustment of the end mirror 9 (see below), but not absolutely necessary.

In all the examples shown in FIGS. 3A-3C, the mirror face F is respectively polished and has a highly reflective coating, which has a reflectivity of ideally more than about 99.98% for the laser beam 5. In the example shown, the laser beam 5 has a wavelength of 1030 nm, although it is to be understood that the reflective coating may also be configured, or optimized, for laser beams 5 at a different wavelength. The reflective coating may, in particular, also be configured to compensate for a variation of the polarization state of the laser beam 5, which is generated by impingement of the laser beam 5 at different angles of incidence, deviating from 45°. As an alternative, such a modification may be compensated for by a phase shift, which is generated by phase-shifting elements arranged in the beam path of the laser beam 5, for example by a λ/4 plate and/or a λ/8 plate.

Figure 4A:
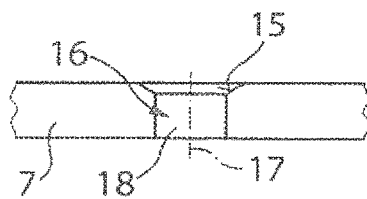
FIGS. 4A-4C show schematic representations of recesses in a base body of the deflecting device, having a lateral face in the form of a conical face, a spherical face and a freeform face.
Figure 4B:
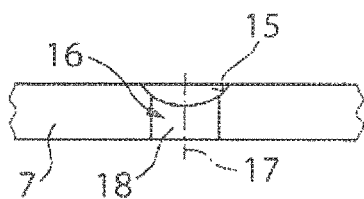
Figure 4C:
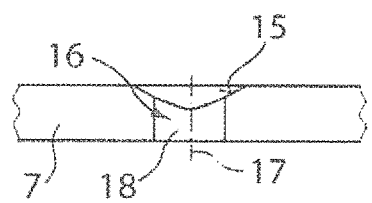

The spherical cap 14, or the spherical surface of the spherical segment 12, has a defined, typically low roughness, to improve the bearing on a lateral face 15 of a recess 16 in the plate-shaped base body 7, as represented, by way of example, in FIGS. 4A-4C. In the three examples shown, the lateral face 15 is configured radially symmetrically with respect to a center axis 17 of the lateral face 15, which coincides with the center axis 17 of the likewise rotationally symmetrical recess 16. The three examples shown in FIGS. 4A-4C differ by the type of curvature of the lateral face 15, which in the example shown in FIG. 4A is a conical face, in the example shown in FIG. 4B is a spherical face, and in the example shown in FIG. 4C is a freeform face in the manner of an axicon. The different configuration of the lateral faces 15 makes it possible to produce a desired linear or circular contact with the spherical cap 14. For example, by selection of the aperture angle of the conical lateral face 15 shown in FIG. 4A, of the radius of the spherical lateral face 15 shown in FIG. 4B, or of the geometry of the freeform face shown in FIG. 4C, it is possible to influence the height in the Z direction at which the contact between the lateral face 15 and the spherical cap 14 takes place. As can be seen in FIGS. 4A-4C, the recesses 16 respectively have a cylindrical section 18, which follows on from the lateral face 15 and extends as far as the lower side, facing away from the lateral face 15 of the plate-shaped body 7, of the base body 7, i.e. the recesses 16 form holes in the base body 7. Since the adjustment may also be carried out from the upper side of the base body 7, the recesses 16 do not necessarily need to comprise holes.

Figure 5A:
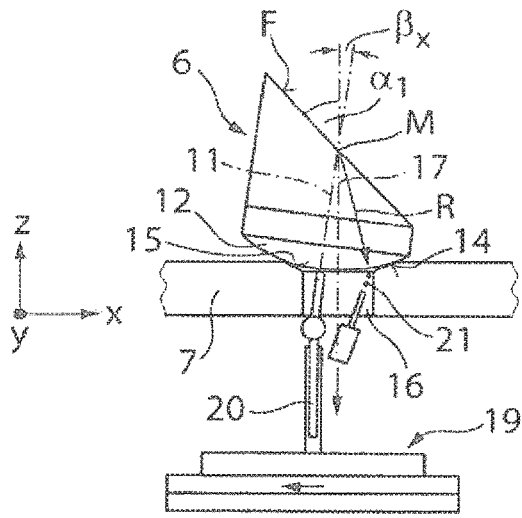
FIGS. 5A and 5B show schematic representations of the adjustment and fixing of a mirror element by a recess, which forms a hole in the base body.
Figure 5B:
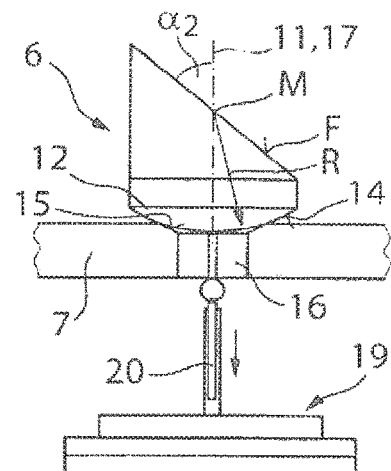

With the aid of the recesses 16 configured as holes, orientation or adjustment of mirror elements 6 accommodated in the recesses 16 may be carried out from the lower side of the plate-shaped base body 7. FIGS. 5A and 5B show, by way of example, an adjustment device 19 having a suction arm 20, which comprises a section that can be swiveled by means of an articulation, to adjust a desired orientation of the mirror element 6, or more precisely of the connecting section 12 in the form of the spherical segment, with respect to the lateral face 15 of the recess 16. To this end, the suction arm 20 exerts a suction force on the mirror element 6, as indicated in FIG. 5B by a force arrow.

As can be seen in FIG. 5A, during the adjustment of the mirror element 6 it is possible to set a tilt angle βX between the center axis 11 of the connecting section 12 and the center axis 17 of the lateral face 15, or of the recess 16, in the XZ plane, which in the example shown is not more than about 10° but may optionally also be greater. The tilt angle βx may of course also be 0°, as is represented in FIG. 5B. Upon variation of the tilt angle βx during the adjustment it is favorable that the center point M of the mirror face F coincides with the center point M of the radius of curvature R of the spherical cap 14 of the spherical segment 12, so that it lies on the rotation axis during the adjustment and a lateral offset of the center point M therefore does not take place. For the adjustment, besides the tilt angle βx in the XZ plane, it is also possible to set a tilt angle βY (not represented) in the YZ plane and a rotation angle (not represented) about the center axis 11 of the connecting section 12. To suitably orientate the mirror elements 6 during the adjustment, the laser beam 5 from the beam source may be reflected back by means of two of the mirror faces F2, F3 to the laser disk 2, the mirror elements 6 being tilted or rotated during the adjustment so that the laser beam 5 strikes the laser disk 2 centrally. The adjustment may also be carried out correspondingly for the other mirror elements 6.

As soon as the mirror element 6 is arranged in the desired orientation or position relative to the plate-shaped base body 7, for example with the aid of the suction arm 20, it can be permanently connected to the base body 7. To this end, in the example shown, an adhesive 21 as a joining agent is introduced into the intermediate space between the lateral face 15 and the mirror element 6, as is represented in FIG. 5A.

Both the material of the base body 7 and the material of the mirror elements 6 may, for example, be glass or a glass ceramic, which ideally is transparent or essentially transparent for the wavelength of the laser beam 5. The material of the base body 7 and the material of the mirror elements 6 should have a thermal expansion coefficient that is as similar as possible: for example, the thermal expansion coefficient (for a length variation) of the two materials may differ by less than $2\times10$-6 l/K. It is therefore favorable for the two materials to be formed to at least 80 wt % from the same material, in particular from identical material. This is the case, for example, when the base body 7 is formed from titanium-doped quartz glass (ULE®) and the mirror elements 6 are formed from conventional quartz glass. As an alternative, the base body 7 may be formed from a glass ceramic, for example from Zerodur®, and the mirror elements 6 may be formed from quartz glass, or vice versa. As an alternative, the material of the base body 7, and optionally also the material of the mirror elements 6, may be a metallic material, for example an Invar alloy. A base body 7 made of an Invar alloy may be welded to mirror elements 6 made of glass or a glass ceramic, although a material-fit connection is also possible, for example by soldering or adhesive bonding.

Particularly when using materials containing glass or consisting of glass, a material-fit connection between the mirror element 6, or more precisely the spherical cap 14 of the spherical segment 12, and the lateral face 15 may also be carried out with the aid of a different joining agent, for example with the aid of a (glass) solder.

As an alternative to a material-fit connection, the mirror element 6 may also be connected to the base body 7 by a direct connection, for example by (glass) welding or by bonding, i.e. typically by (optionally local) heating of the base body 7 and of the mirror element 6, until a rigid and permanent connection is formed between the lateral face 15 of the recess 16 and the spherical cap 14.

As can likewise be seen in FIGS. 5A and 5B, in the mirror element 6 shown in FIG. 5A the mirror face F is oriented at a first angle $\alpha 1$ with respect to the center axis 11 of the connecting section 12, which is less than 45°, and in the mirror element 6 shown in FIG. 5B the mirror face F is oriented at a second angle $\alpha 2$ with respect to the center axis 11 of the connecting section 12, which is greater than 45°. In this way, the orientation of the mirror face F relative to the XY plane, or relative to the laser disk 2 may be adjusted in addition to the selection of the tilt angle $\beta x$, $\beta y$. This is favorable in particular for mirror elements 6 that are arranged relatively far away from the center axis 11 of the base body 7, and for which the incidence and reflection angles of the laser beam 5 generally deviate most greatly from 45°. By setting the tilt angle $\beta x$, $\beta y$, it is possible to carry out fine adjustment in the orientation of the mirror elements 6.

Typically, in the example shown in FIG. 5B, in which the center axis of the connecting section 12 is oriented parallel to the z direction, the second angle $\alpha 2$ with respect to the center axis 11 of the connecting section 12 is different to 45°. In this case, typically for all mirror elements 6 that have the same (non-zero) radial distance from the center axis 11, because they are arranged in the same ring region R1, R2, R3, the second angle $\alpha 2$ is either greater than 45° or less than 45°. Only in the case of a deflection between the ring regions R1, R2, R3, for example from the first ring region R1 into the second ring region R2, does a deflection in the other direction (less than or greater than) 45° typically take place.

Figure 6A:
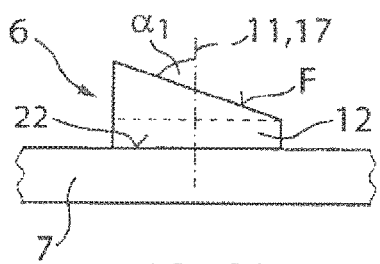
FIGS. 6A and 6B show schematic representations of a mirror element having a cylindrical connecting section, on which a planar base face of the base body is fastened, or which is received in a cylindrical recess of the base body.
Figure 6B:
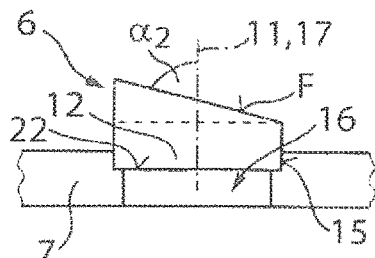

FIGS. 6A and 6B show examples of the fastening of mirror elements 6 on the base body 7, which respectively comprise a cylindrical connecting section 12 with a planar base face 22. In the example shown in FIG. 6A, the mirror element 6 is fastened with the planar base face 22 on the side of the base body 7 facing toward the laser disk 2 and is connected directly thereto by a welded connection, while the cylindrical connecting section 12 in the example shown in FIG. 6B is fitted into a recess 16 of the base body 7, which comprises a cylindrical lateral face 15 with a shoulder on which the planar base face 22 of the connecting section 12 bears on the outer edge. In the examples shown in FIGS. 6A and 6B, the center axis 11 of the cylindrical connecting section 12 is always oriented perpendicularly to the plate-shaped base body 7 and coincides with the center axis 17 of the recess 16 in the example shown in FIG. 6B. In the examples shown in FIGS. 6A and 6B, it is therefore not possible to carry out adjustment of the tilt angle $\beta$, but merely adjustment of the rotation angle about the center axis 11 of the cylindrical connecting section 12, before the respective mirror element 6 is connected permanently to the base body 7. In this case, a suitable angle $\alpha 1$, $\alpha 2$ between the mirror face F and the center axis 11 of the connecting section 12 is already determined during manufacture of the mirror element 6.

In the example shown in FIG. 6B, the rotation angle about the center axis 11 can be adjusted by rotating the mirror element 6 in the recess 16. In the example shown in FIG. 6A, to this end a template (not represented), which comprises circular through-openings for the respective mirror elements 6, may be placed on the upper side of the base body 7. The mirror elements 6 may in this case be rotated in the openings about the respective center axis 11 until the desired rotation angle is reached. Automated machine application of the mirror elements 6 on the upper side of the base body 7 at a desired rotation angle is also possible. After the adjustment of the rotation angle, the mirror elements 6 may be connected with a material fit or directly to the plate-shaped base body 7. Optionally, a joining agent, for example an adhesive, may already be introduced between the planar base face 22 and the upper side of the plate-shaped base body 7 before the adjustment of the rotation angle. In this case, the adjustment of the rotation angle of the respective mirror elements 6 must be finished before the adhesive cures. It is to be understood that, in the example shown in FIG. 6B, the cylindrical connecting section 12 need not necessarily have a planar base face 22 since it is merely the geometry at the outer edge of the connecting section 12 that is important. It is also to be understood that instead of a stepped shoulder it is optionally also possible to form a conical shoulder on the recess 16, which serves as a support for the mirror element 6, which is correspondingly shaped on its lower side or at its edge.

In the examples described above, the mirror elements 6 are formed in one piece. It is, however, to be understood that the mirror elements 6 may also be formed in a plurality of pieces, the pieces of the mirror elements 6 being monolithically joined in this case, i.e. likewise connected to one another by a material-fit or direct connection. For example, in this case the connecting section 12 and the cylindrical section 13 of the mirror elements 6 may form two components, which are connected to one another with a material fit or directly.

With the aid of the mounting or fastening techniques described above, by using a suitable base body 7 it is possible to produce quasimonolithic mirror arrays that can be oriented with few degrees of freedom with respect to the laser disk 2, so that the overall stability of the disk laser amplifier 1 is increased. In particular, in this case precise orientation of the mirror elements 6 with an accuracy of the order of about 10 μrad can be achieved. By the deflecting technique described above, at the same time the number of optical components required and the complexity of the beam path of the laser beam 5 can be reduced to a minimum. The use of the fewest possible optical and mechanical components allows economical and, in particular, robust production of the disk laser amplifier 1.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. An optical arrangement, comprising:
a disk-shaped laser-active medium; and
a deflecting device, comprising
a plurality of mirror elements on which a plurality of mirror faces for deflecting a laser beam are formed, and
a base body on which the plurality of mirror elements are fastened, the plurality of mirror faces of the plurality of mirror elements being oriented in such a way that the laser beam is deflected by a respective mirror face of the plurality of mirror faces via the disk-shaped laser-active medium to another mirror face of the plurality of mirror faces,
wherein the plurality of mirror elements are formed in one piece or are monolithically joined, and have a connecting section that is formed rotationally symmetrically with respect to a center axis and is rigidly connected by a material-fit connection or a direct connection to the base body,
wherein recesses are formed in the base body that respectively have lateral faces for the material-fit connection or the direct connection to the connecting section of a respective mirror element,
wherein the connecting section is formed by a spherical segment, and
wherein the spherical segment is connected at a spherical cap of the spherical segment with a material-fit connection or a direct connection to the respective lateral face of a respective recess of the base body.

2. The optical arrangement of claim 1, wherein planar mirror faces of the plurality of mirror elements are oriented at an angle of between 30° and 60° with respect to the center axis of the connecting section.

3. The optical arrangement of claim 1, wherein for a first mirror element a first mirror face is oriented at a first angle with respect to the center axis of the connecting section, and wherein for a second mirror element a second mirror face is oriented at a second angle, different from the first angle, with respect to the center axis of the connecting section.

4. The optical arrangement of claim 1, wherein the recesses form holes in the base body.

5. The optical arrangement of claim 1, wherein the lateral face of the recesses are formed rotationally symmetrically with respect to a respective center axis of the lateral faces.

6. The optical arrangement of claim 1, wherein the lateral faces of the recesses form a spherical face, a conical face or a freeform face.

7. The optical arrangement of claim 5, wherein the center axis of the connecting section of at least one mirror element is oriented at a tilt angle with respect to the center axis of a respective lateral face.

8. The optical arrangement of claim 1, wherein the plurality of mirror elements comprise a cylindrical section that is adjacent to the spherical segment and on which the plurality of mirror face are formed.

9. The optical arrangement of claim 1, wherein the spherical segment has a radius of curvature whose center point lies on a mirror face of a mirror element of the plurality of mirror elements.

10. The optical arrangement of claim 1, wherein the connecting sections of the plurality of mirror elements are cylindrical.

11. The optical arrangement of claim 1, wherein the plurality of mirror elements are arranged on the base body in a plurality of circular rings or in a plurality of regular polygons.

12. The optical arrangement of claim 1, wherein for more than half of the plurality of mirror elements, direct deflection takes place between mirror faces of respectively two neighboring mirror elements along a common deflection direction.

13. The optical arrangement of claim 1, further comprising: an end mirror whose mirror face is oriented perpendicularly to the laser beam striking a respective mirror face of the end mirror, so that the laser beam is reflected back to the disk-shaped laser-active medium.

14. The optical arrangement of claim 1, wherein the base body of the deflecting device is formed from a material that coincides to at least 80 wt % with the material of the plurality of mirror elements.

15. The optical arrangement of claim 1, wherein the base body and/or the plurality of mirror elements are formed from glass, from a glass ceramic, or from a metallic material.

16. The optical arrangement of claim 1, wherein the material-fit connection is formed by an adhesive connection and/or a soldered connection, or wherein the direct connection is formed by a welded connection and/or by a bonding connection.

* * * * *